(12) United States Patent
Meyer

(10) Patent No.: US 6,430,179 B1
(45) Date of Patent: Aug. 6, 2002

(54) THREE STAGE ROUTER FOR BROADCAST APPLICATION

(75) Inventor: Charles S. Meyer, Nevada City, CA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/256,160

(22) Filed: Feb. 24, 1999

(51) Int. Cl.[7] ............................................... H04Q 11/00
(52) U.S. Cl. ....................... 370/360; 370/388; 340/2.21; 379/271
(58) Field of Search .................................. 370/351, 357, 370/360, 386, 388, 389, 395, 400; 340/825.01, 2.1, 2.2, 2.21, 14.1, 14.2; 379/268, 271, 272

(56) References Cited

U.S. PATENT DOCUMENTS

| 5,214,640 A | * | 5/1993 | Sakurai et al. ................ 370/60 |
| 5,542,048 A | * | 7/1996 | Olnowich et al. ...... 395/200.15 |
| 5,889,775 A | * | 3/1999 | Sawicz et al. ............... 370/360 |
| 6,078,585 A | * | 6/2000 | Kakuma et al. ............ 370/395 |
| 6,157,643 A | * | 12/2000 | Ma ............................ 370/389 |
| 6,226,683 B1 | * | 5/2001 | Olnowich et al. .......... 709/238 |

* cited by examiner

Primary Examiner—Alpus H. Hsu
(74) Attorney, Agent, or Firm—Merchant & Gould P.C.

(57) ABSTRACT

A multi-stage signal router includes a clocked storage element connected to each output of each stage of the router. Each clocked storage element is responsive to a trigger event of a clock signal to capture a signal level present at the output to which it is connected and hold the signal level at its own output until a subsequent trigger event of the clock signal.

5 Claims, 1 Drawing Sheet

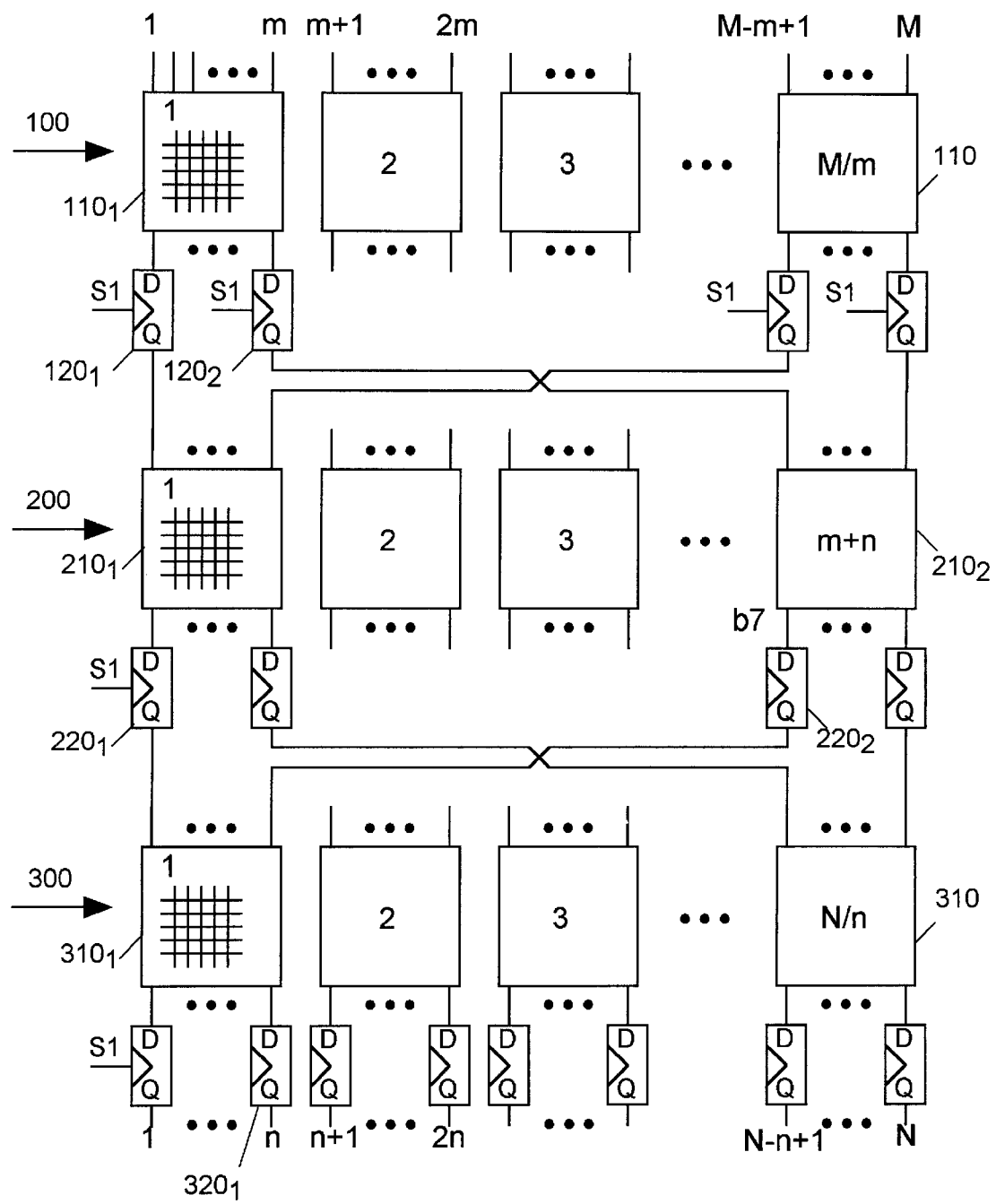

THREE STAGE ROUTER FOR BROADCAST APPLICATION

BACKGROUND OF THE INVENTION

This invention relates to a three stage router for broadcast application.

A rectangular crosspoint switch matrix is nonblocking with respect to broadcast connections, in that for any existing connection of an ith input to a set of outputs {j}, it is possible to connect the kth input to a set of outputs {1} (1≠j) without being blocked by the connection from the ith input to the set of outputs {j}.

The conventional three-stage router having M input terminals and N output terminals comprises a first or input stage composed of M/m router modules each having m inputs connected to respective input terminals of the router and a crosspoint switch matrix for connecting any one of the inputs of the module to any selected one of m+n−1 outputs of the module, a second stage, or interstage, composed of m+n−1 router modules each having M/m inputs connected each to one output of one module of the first stage and a crosspoint switch matrix for connecting any one of the inputs of the module to any selected one of N/n outputs of the module, and a third or output stage composed of N/n router modules each having m+n−1 inputs connected each to one output of one module of the second stage and a crosspoint switch matrix for connecting any one of the inputs of the module to any selected one of n outputs of the module, connected to respective output terminals of the router.

It has been shown that the three-stage router is nonblocking for one-to-one connections. This three stage topology has advantages over a single stage matrix having M inputs and N outputs, since as M and N increase, there are practical difficulties associated with constructing a switch having MxN crosspoints.

The conventional three-stage router having m+n−1 second stage modules is not nonblocking with respect to one-to-many, i.e. broadcast, connections. It has been suggested that the three-stage router could be rendered nonblocking with respect to broadcast connections if it had one additional second stage router module, so that there were m+n second stage router modules. It would, of course, then be necessary to increase by one the number of outputs of each first stage module and to increase by one the number of inputs of each third stage module.

It has also been suggested that even though a three-stage router having m+n second stage router modules is nonblocking with respect to broadcast connections, i.e. the router can make any desired set of broadcast connections, each from one input terminal to one or more output terminals, provided only that there is no input terminal or output terminal common to two or more connections, it might nevertheless be necessary to repath an existing connection in order to make a new connection. The need to repath an existing connection may be subject to disadvantage. Suppose, for example, that the three-stage router is being used for routing digital signals that do not change state except at the beginning or end of a bit cell having a duration of 200 ns and that the router is configured to connect the ith input terminal to the jth output terminal over a path having a delay of 100 ns. After the router has settled, bits would be received at the jth output terminal at intervals of 200 ns, determined by the duration of the bit cell and not by the path delay through the router. Suppose further that the connection from the ith input terminal to the jth output terminal is to be repathed, and that the new connection will have a delay of 150 ns. Immediately after the router has been reconfigured, there would be an interval of 50 ns during which the state of the jth output terminal would be uncertain and then the bits would resume at 200 ns intervals. The interval of 50 ns during which the output signal is uncertain could result in a downstream machine that receives the signal from the router losing synchronization with the signal or otherwise behaving in an unexpected way. Consequently, a signal that is repathed behaves as though it were switched even though the user of the router would not have anticipated this.

SUMMARY OF THE INVENTION

In accordance with a first aspect of the invention there is provided a signal router having M input terminals and N output terminals and comprising an input router stage having M inputs connected respectively to the M input terminals of the router and composed of M/m router modules each having m inputs, p outputs and a first switch means for selectively connecting any one of the m inputs to any one of the p outputs, and an intermediate router stage composed of p router modules each having M/m inputs and N/n outputs and a second switch means for selectively connecting any one of the M/m inputs to any one of the N/n outputs, an output router stage composed of N/n router modules each having p inputs and n outputs and a third switch means for selectively connecting any one of the p inputs to any one of the n outputs, p*(M/m) input stage clocked storage elements connected respectively between the outputs of the router modules of the input router stage and the inputs of the router modules of the intermediate router stage, the input stage clocked storage elements being responsive to a trigger event of a clock signal to capture a signal level present at the ith output of the jth router module of the input router stage (1<=i<=p; 1<=j<=M/m) and hold the signal level at the jth input of the pth router module of the intermediate router stage until a subsequent trigger event of the clock signal, p*N/n intermediate stage clocked storage elements connected respectively between the outputs of the router modules of the intermediate router stage and the inputs of the router modules of the output router stage, the intermediate stage clocked storage elements being responsive to a trigger event of said clock signal to capture a signal level present at the kth output of the lth router module of the second router stage (1<=k<=N/n; 1<=l<=p) and hold the signal level at the lth input of the kth router module of the output router stage until a subsequent trigger event of the clock signal, and N output stage clocked storage elements connected respectively between the outputs of the router modules of the third router stage and the output terminals of the router, the output stage clocked storage elements being responsive to a trigger event of said clock signal to capture a signal level present at the uth output of the vth router module of the third router stage (1<=u<=n; 1<=v<=N/n) and hold the signal level at the (n*v+u)th output terminal of the router until a subsequent trigger event of the clock signal.

In accordance with a second aspect of the invention there is provided a signal router comprising a first router stage composed of M/m router modules each having m inputs and m+n outputs and a first switch means for selectively connecting any one of the m inputs to any selected set of the m+n outputs, a second router stage composed of m+n router modules each having M/m inputs and N/n outputs and a second switch means for selectively connecting one of the M/m inputs to any selected set of the N/n outputs, a third router stage composed of N/n router modules each having m+n inputs and n outputs and a third switch means for selectively connecting any one of the m+n inputs to any selected set of the n outputs, (n+m)*(M/m) first clocked storage elements connected respectively between the outputs of the router modules of the first router stage and the inputs of the router modules of the second router stage, the first clocked storage elements being responsive to a trigger event of a clock signal to capture a signal level present at the ith output of the jth router module of the first router stage (1<=i<=m; 1<=j<=M/m) and hold the signal level at the jth input of the ith router module of the second router stage until a subsequent trigger event of said clock signal, (n+m)*(N/n) second clocked storage elements connected respectively between the outputs of the router modules of the second router stage and the inputs of the router modules of the third router stage, the second clocked storage elements being responsive to a trigger event of said clock signal to capture a signal level present at the kth output of the lth router module of the second router stage (1<=k<=N/n; 1<=l<=m+n) and hold the signal level at the lth input of the kth router module of the third router stage until a subsequent trigger event of said clock signal, and N third clocked storage elements connected respectively between the outputs of the router modules of the third router stage and the output terminals of the router, the third clocked storage elements being responsive to a trigger event of said clock signal to capture a signal level present at the uth output of the vth router module of the third router stage (1<=u<=n; 1<=v<=N/n) and hold the signal level at the (v*n+u)th output terminal of the router until a subsequent trigger event of said clock signal.

In accordance with a third aspect of the invention there is provided a signal router comprising a first router stage composed of M/m router modules each having m inputs and p outputs and a first switch means for selectively connecting any one of the m inputs to any selected set of the p outputs, a second router stage having p*M/m inputs associated respectively with the outputs of the router modules of the first router stage and also having q*N/n outputs and including a second switch means for selectively interconnecting the p*M/m inputs and the q*N/n outputs, a third router stage composed of N/n router modules each having p inputs and n outputs and a third switch means for selectively connecting any one of the p inputs to any selected set of the n outputs, the inputs of the router modules of the third router stage being associated respectively with the q*N/n outputs of the second router stage, p*(M/m) first clocked storage elements connected respectively between the outputs of the router modules of the first router stage and the respectively associated inputs of the second router stage, the first clocked storage elements being responsive to a trigger event of a clock signal to capture a signal level present at the ith output of the jth router module of the first router stage (1<=i<=m; 1<=j<=M/m) and hold the signal level at the associated input of the second router stage until a subsequent trigger event of the clock signal, p*(N/n) second clocked storage elements connected respectively between the outputs of the second router stage and the respectively associated inputs of the router modules of the third router stage, the second clocked storage elements being responsive to a trigger event of said clock signal to capture a signal level present at an output of the second router stage and hold the signal level at the associated input of a router module of the third router stage until a subsequent trigger event of the clock signal, and N third clocked storage elements connected respectively between the outputs of the router modules of the third router stage and the output terminals of the router, the third clocked storage elements being responsive to a trigger event of said clock signal to capture a signal level present at the uth output of the vth router module of the first router stage (1<=u<=n; 1<=v<=N/n) and hold the signal level at the (n*v+u)th output terminal of the router until a subsequent trigger event of the clock signal.

BRIEF DESCRIPTION OF THE DRAWINGS

For a better understanding of the invention, and to show how the same may be carried into effect, reference will now be made, by way of example, to the accompanying drawings, the single FIGURE of which is a schematic block diagram of a three-stage router in accordance with the present invention.

DETAILED DESCRIPTION

The illustrated three-stage router is used for routing digital signals that do not change state except at the beginning or end of a bit cell. The invention will be described with reference to signals in which the bit cell has a duration of 200 ns.

Referring to FIG. 1, the illustrated three-stage router has M input terminals and N output terminals. The M input terminals are connected in groups of m to respective inputs of M/m router modules 110 of a first stage of the router. Each router module includes an m*(m+n) crosspoint matrix, which provides a nonblocking connection between the m inputs of the module and the n+m outputs of the module.

The second stage of the router is functionally a switch having (m+n)*M/m inputs and (m+n)*N/n outputs. As shown in FIG. 1, the second stage of the router may be composed of m+n router modules 210 each having M/m inputs and N/n outputs and including an (M/m)*(N/n) crosspoint matrix, which provides a nonblocking connection between the M/m inputs of the module and the N/n outputs of the module. However, the second stage may itself be composed of multiple stages each composed of multiple router modules.

The third stage of the router comprises N/n router modules each having m+n inputs and n outputs and including an (m+n)*n crosspoint matrix, which provides a nonblocking connection between the m+n inputs of the module and the N/n outputs of the module.

The first stage 100 of the router also includes, in addition to the router modules 110, (m+n)*M/m D flip flops 120 connected to the respective outputs of the router modules 110. The Q outputs of the flip flops 120 are connected to respective inputs of the second stage 200. Similarly, the second stage 200 of the router includes (m+n)*N/n D flip flops 220 connected to the respective outputs of the router modules 210. The Q outputs of the flip flops 220 are connected to respective inputs of the third stage 300. The third stage of the router includes N D flip flops 320 connected to the respective outputs of the router modules 310. The Q outputs of the flip flops 320 are connected to respective output terminals of the router. The flip flops 120, 220 and 320 are driven by a common master clock signal S1 having a period equal to the duration of the bit cell of the data signal, i.e. 200 ns.

In the following discussion, it will be assumed that at time t0 the crosspoint switch matrix of module $110_1$, connects input 1 of the module $110_1$ to output 1 of that module, output 1 of module $110_1$ is connected through the flip flop $120_1$ to input 1 of the module $210_1$, the crosspoint switch matrix of module $210_1$ connects input 1 of the module $210_1$ to output 1 of that module, output 1 of module $210_1$ is connected through the flip flop $220_1$ to input 1 of the module $310_1$, and the crosspoint switch matrix of module $310_1$ connects input 1 of the module $310_1$ to output n of that module. In this manner, input terminal 1 of the router is connected to output terminal n. A digital signal including bits b4, b5, b6, etc. is being supplied to the input terminal 1 and has been propagated along the path from input terminal 1 of the router to output terminal n, such that at time t0, which is immediately after the first master clock pulse of a sequence that started before time to, bit b4 is at output terminal n of the router, bit b5 is at the output of the flip flop $220_1$, bit b6 is at the output of the flip flop $120_1$ and bit b7 is at the input of the router. The signal does not change state except at intervals of 200 ns.

It will also be assumed that a new connection is to be made. The nature of the new connection is not relevant except that it necessitates repathing of the connection from input terminal 1 to output terminal n by way of module $210_2$ of the second stage 200.

During the interval before the second master clock pulse of the sequence, the switch matrix of the router module $110_1$ is reconfigured so that input 1 of the module $110_1$ is connected to output m+n of that module. During reconfiguration, the inputs to the flip flops 120 are disturbed but the outputs of the flip flops 120 are not affected. In particular, bit b6 remains at the output of the flip flop $120_1$. After the router module $110_1$ has been reconfigured and its outputs have settled, the input of the flip flop $120_1$ is in an unknown state and bit b7 is at the input of the flip flop $120_2$. Immediately before the second master clock pulse, bit b6 is at the input of the flip flop $220_1$ and bit b5 is at the input of the flip flop $320_1$. On the second master clock pulse, the Q output of the flip flop $120_1$ changes to an unknown state and the Q output of the flip flop $120_2$ changes to bit b7. Further, the output of the flip flop $320_1$ changes to bit b5 and the output of flip flop $220_1$ changes to bit b6.

During the interval before the master third clock pulse of the sequence, the switch matrixes of the modules $210_1$ and $210_2$ are reconfigured so that input 1 of the module $210_1$ is no longer connected to output 1 of that module and input 1 of the module $210_2$ is connected to output 1 of that module. Immediately before the third master clock pulse, bit b8 is at the input of the flip flop $120_2$, bit b7 is at the input of flip flop $220_2$ and bit b6 is at the input of the flip flop $320_1$. On the third master clock pulse, the output of the flip flop $120_2$ changes to bit b8, the output of the flip flop $220_2$ changes to bit b7 and the output of the flip flop $320_1$ changes to bit b6.

During the interval before the fourth master clock pulse of the sequence, the switch matrix of the module $310_1$ is reconfigured to connect input m+n to output n. Immediately before the fourth master clock pulse, bit b9 is at the input of the flip flop $120_2$, bit b8 is at the input of flip flop $220_3$ and bit b7 is at the input of the flip flop $320_1$. On the fourth master clock pulse, the output of the flip flop $320_1$ changes to bit b7, the output of the flip flop $220_2$ changes to bit b8 and the output of the flip flop $120_2$ changes to bit b9.

Since the signal is reclocked at each router stage, the signal received at output terminal n of the router is the sequence of bits b4, b5, b6, b7, b8, etc., and the signal does not change state except at intervals of 200 ns, controlled by the master clock. Thus, the repathing has no effect on the sequence or timing of bits at the output terminal n and is transparent to the user.

The condition that is necessary for proper operation in this manner is that the period of the master clock signal should be greater than the path delay between stages. The path delay is the time taken for the output of a flip flop in the first or second stage of the router to reach the input of the next flip flop, in the second or third stage, in its path through the router. The path delay between stages has three principal components, namely the propagation delay (high-to-low or low-to-high) of the upstream flip flop in response to a clock pulse, plus the physical path to the input of the downstream flip flop, plus the set up time of the downstream flip flop.

It will be appreciated that the invention is not restricted to the particular embodiment that has been described, and that variations may be made therein without departing from the scope of the invention as defined in the appended claims and equivalents thereof. For example, although the invention has been described with reference to a three-stage router, it is also applicable to a router in which the intermediate stage is itself composed of two or more stages, so that the router has four or more stages. A router having four (or more) stages provides more possibilities for connecting a given input to a selected set of outputs, although the algorithms for selecting the paths are more complex. In the case of a router in which the intermediate stage is composed of two or more stages, it is not necessary to provide flip flops between the outputs of an upstream stage and the inputs of a downstream stage if the maximum path delay through the upstream stage is less than the event time (the duration of the bit cell of the data signal, or 200 ns in the example). Further, although the invention has been described with reference to a router having m+n second stage router modules, the invention is not restricted to this number. For example, with more than m+n second stage router modules, repathing would be required less frequently than with m+n modules; and a router with fewer than m+n second stage router modules may provide non-blocking point-to-point connection subject to possible repathing with the advantage that the algorithm for calculating the new path is simpler and can therefore be solved more quickly. Moreover, although the invention has been described having particular regard to propagation of electrical signals, the principle of shifting the data value through the several stages of the router in the manner of a shift register is also applicable to optical signals.

What is claimed is:

1. A signal router having M input terminals and N output terminals and comprising:

an input router stage having M inputs connected respectively to the M input terminals of the router and composed of M/m router modules each having m inputs, p outputs and a first switch means for selectively connecting any one of the m inputs to any one of the p outputs, and an intermediate router stage composed of p router modules each having M/m inputs and N/n outputs and a second switch means for selectively connecting any one of the M/m inputs to any one of the N/n outputs, an output router stage composed of N/n router modules each having p inputs and n outputs and a third switch means for selectively connecting any one of the p inputs to any one of the n outputs, p*(M/m) input stage clocked storage elements connected respectively between the outputs of the router modules of the input router stage and the inputs of the router modules of the intermediate router stage, the input stage clocked storage elements being responsive to a trigger event of a clock signal to capture a signal level present at the ith output of the jth router module of the input router stage (1<=i<=p; 1<=j<=M/m) and hold the signal level at the jth input of the pth router module of the intermediate router stage until a subsequent trigger event of the clock signal, p*N/n intermediate stage clocked storage elements connected respectively between the outputs of the router modules of the intermediate router stage and the inputs of the router modules of the output router stage, the intermediate stage clocked storage elements being responsive to a trigger event of said clock signal to capture a signal level present at the kth output of the lth router module of the second router stage (1<=k<=N/n; 1<=l<=p) and hold the signal level at the lth input of the kth router module of the output router stage until a subsequent trigger event of the clock signal, and N output stage clocked storage elements connected respectively between the outputs of the router modules of the third router stage and the output terminals of the router, the output stage clocked storage elements being responsive to a trigger event of said clock signal to capture a signal level present at the uth output of the vth router module of the third router stage (1<=u<=n; 1<=v<=N/n) and hold the signal level at the (n*v+u)th output terminal of the router until a subsequent trigger event of the clock signal.

2. A signal router according to claim 1, wherein the switch means of each router module of at least one stage is operable for selectively connecting any one of the inputs of the module to any selected set of outputs of the module.

3. A signal router according to claim 1, wherein the first switch means is operable for selectively connecting any one of the m inputs of a router module of the input stage to any selected set of the p outputs thereof, the second switch means is operable for selectively connecting any one of the M/m inputs of a router module of the intermediate stage to any one of the N/n outputs thereof, and the third switch means is operable for selectively connecting any one of the p inputs of a router module of the output stage to any one of the n outputs thereof.

4. A signal router comprising:

a first router stage composed of M/m router modules each having m inputs and m+n outputs and a first switch means for selectively connecting any one of the m inputs to any selected set of the m+n outputs, a second router stage composed of m+n router modules each having M/m inputs and N/n outputs and a second switch means for selectively connecting one of the M/m inputs to any selected set of the N/n outputs, a third router stage composed of N/n router modules each having m+n inputs and n outputs and a third switch means for selectively connecting any one of the m+n inputs to any selected set of the n outputs, (n+m)*(M/m) first clocked storage elements connected respectively between the outputs of the router modules of the first router stage and the inputs of the router modules of the second router stage, the first clocked storage elements being responsive to a trigger event of a clock signal to capture a signal level present at the ith output of the jth router module of the first router stage (1<=i<=m; 1<=j<=M/m) and hold the signal level at the jth input of the ith router module of the second router stage until a subsequent trigger event of said clock signal, (n+m)*(N/n) second clocked storage elements connected respectively between the outputs of the router modules of the second router stage and the inputs of the router modules of the third router stage, the second clocked storage elements being responsive to a trigger event of said clock signal to capture a signal level present at the kth output of the lth router module of the second router stage (1<=k<=N/n; 1<=l<=m+n) and hold the signal level at the lth input of the kth router module of the third router stage until a subsequent trigger event of said clock signal, and N third clocked storage elements connected respectively between the outputs of the router modules of the third router stage and the output terminals of the router, the third clocked storage elements being responsive to a trigger event of said clock signal to capture a signal level present at the uth output of the vth router module of the third router stage (1<=u<=n; 1<=v<=N/n) and hold the signal level at the (v*n+u)th output terminal of the router until a subsequent trigger event of said clock signal.

5. A signal router comprising:

a first router stage composed of M/m router modules each having m inputs and p outputs and a first switch means for selectively connecting any one of the m inputs to any selected set of the p outputs, a second router stage having p*M/m inputs associated respectively with the outputs of the router modules of the first router stage and also having q*N/n outputs and including a second switch means for selectively interconnecting the p*M/m inputs and the q*N/n outputs, a third router stage composed of N/n router modules each having p inputs and n outputs and a third switch means for selectively connecting any one of the p inputs to any selected set of the n outputs, the inputs of the router modules of the third router stage being associated respectively with the q*N/n outputs of the second router stage, p*(M/m) first clocked storage elements connected respectively between the outputs of the router modules of the first router stage and the respectively associated inputs of the second router stage, the first clocked storage elements being responsive to a trigger event of a clock signal to capture a signal level present at the ith output of the jth router module of the first router stage (1<=i<=m; 1<=j<=M/m) and hold the signal level at the associated input of the second router stage until a subsequent trigger event of the clock signal, p*(N/n) second clocked storage elements connected respectively between the outputs of the second router stage and the respectively associated inputs of the router modules of the third router stage, the second clocked storage elements being responsive to a trigger event of said clock signal to capture a signal level present at an output of the second router stage and hold the signal level at the associated input of a router module of the third router stage until a subsequent trigger event of the clock signal, and N third clocked storage elements connected respectively between the outputs of the router modules of the third router stage and the output terminals of the router, the third clocked storage elements being responsive to a trigger event of said clock signal to capture a signal level present at the uth output of the vth router module of the first router stage (1<=u<=n; 1<=v<=N/n) and hold the signal level at the (n*v+u)th output terminal of the router until a subsequent trigger event of the clock signal.

* * * * *